(12) United States Patent
Bank et al.

(10) Patent No.: US 11,929,623 B2
(45) Date of Patent: Mar. 12, 2024

(54) FLEXIBLE SYSTEM AND METHOD FOR TRANSMISSION OF ELECTRICAL ENERGY

(71) Applicants: Michael Bank, Jerusalem (IL); Izhak Elyashiv, TeL Aviv (IL)

(72) Inventors: Michael Bank, Jerusalem (IL); Izhak Elyashiv, TeL Aviv (IL)

( * ) Notice: Subject to any disclaimer, the term of this patent is extended or adjusted under 35 U.S.C. 154(b) by 0 days.

(21) Appl. No.: 17/803,162

(22) Filed: Mar. 10, 2022

(65) Prior Publication Data

US 2023/0291205 A1    Sep. 14, 2023

(51) Int. Cl.
*H02J 3/38*    (2006.01)
*B60L 53/14*    (2019.01)
*H02M 3/24*    (2006.01)
*H02J 7/00*    (2006.01)

(52) U.S. Cl.
CPC ............ *H02J 3/381* (2013.01); *B60L 53/14* (2019.02); *H02M 3/24* (2013.01); *H02J 7/007* (2013.01); *H02J 2207/20* (2020.01); *H02J 2300/20* (2020.01)

(58) Field of Classification Search
CPC .... H02J 3/381; H02J 2207/20; H02J 2300/20; H02J 7/007; H02J 3/38; H02J 7/00; B60L 53/14; H02M 3/24
See application file for complete search history.

(56) References Cited

U.S. PATENT DOCUMENTS

2015/0229232 A1\* 8/2015 Bank .................. H02J 4/00
  363/140
2017/0288571 A1\* 10/2017 Lander .............. H02M 1/08

\* cited by examiner

*Primary Examiner* — Robert L Deberadinis

(57) ABSTRACT

For transmitting electrical energy different electric currents are transmitted through different numbers of wires from a plurality of sources, converted into single-wire electric currents with increased voltage, transmitted through a single-wire electrical current transmission line, converted into several electric currents with the reduced voltage and supplied to corresponding consumers.

6 Claims, 6 Drawing Sheets

Converter 1 -> 2

FLEXIBLE SYSTEM AND METHOD FOR TRANSMISSION OF ELECTRICAL ENERGY

BACKGROUND OF THE INVENTION

The present invention relates to a system and a method for transmission of electrical energy.

A system and a method for transmission of electrical energy are known, in which an electrical energy generated by a three-phase electrical generator is transmitted via a three-phase electrical energy transmission line and is supplied to the areas in which consumers are located through branches of the transmission line. These system and method have however significant disadvantages.

The three-phase electrical energy transmission line is very expensive. The branches extending from the three-phase electrical energy transmission line and transitions to an electrical energy line of a different type introduces discoordination of the three-phase electrical energy line which leads to energy losses.

The three-phase electrical energy transmission line is not protected from a weather influence. It does not allow using underground and underwater methods. The three-phase signal in systems of charging of electrical vehicles makes the charging devices very expensive. The three-phase electrical energy system does not allow to provide commutation of energy supply lines. Introduction of energy of reusable sources into the three-phase electrical energy transmission line requires a great number of expensive synchronization devices.

SUMMARY OF THE INVENTION

Accordingly, it is an object of the present invention to provide a new system and a new method for transmission of electrical energy which avoid the disadvantages of the prior art.

In keeping with these objects and with others which will become apparent hereinafter one feature of the present invention resides briefly stated in a system for transmitting electrical energy, comprising a plurality of sources of electric energy generating electric currents transmitted through different numbers of wires, converters receiving the electric currents transmitted through different numbers of wires and converting these electric currents into a single-wire electric currents, a step-up transformer receiving the electric currents transmitted through different numbers of wires and converting them into a single-wire electric current with an increased voltage a single wire through which the single-wire electric current is transmitted, a step-down transformer receiving the transmitted single-wire electric current and reducing its voltage, a switch receiving the single-wire electric current with the reduced voltage, generating from the latter several single-wire electric currents with the reduced voltage and transmitting them in several directions, converters receiving from the switch the single-wire electric currents with the reduced voltage and converting them into different electric currents, and consumers receiving from the converters the different electric currents.

In accordance with another feature of the present invention in the system for transmitting electrical energy the sources of electrical energy are selected from the group consisting of multi-wire sources of electrical energy and renewable electrical energy sources.

In accordance with a further feature of the present invention in the system for transmitting electrical energy the consumers are selected from the group consisting of a multi-wire electrical energy consumer and an electric vehicle charging electrical energy consumer.

In accordance with other features of the present invention a new method of transmitting electrical energy is provided with the steps corresponding to the above-specified features of the inventive system.

When the system is constructed and the method is performed in accordance with the present invention they eliminate the above-specified disadvantages of the know methods and systems.

Furthermore, it is known that the wires of three-phase electrical energy transmission systems different electric currents are transmitted. This is a reason of a mutual influence of these electric currents. The reason for this mutual influence is a difference of potentials between the wires, but not the potentials themselves. The mutual influence between the wires determined a minimal distance between them. A significant distance between them does not allow to make underground electrical energy transmission lines in the three-phase electrical energy transmission systems.

In a symmetrical electrical energy transmission line with identical electric currents in the wires the mutual influence must be minimal. The proposed invention allows to replace the three-phase electric currents by a transmission of three identical electric currents in three identical wires. The reduction of a mutual influence between the electric wires is an additional advantage of the present invention.

DESCRIPTION OF THE PREFERRED EMBODIMENTS

Figure 1:
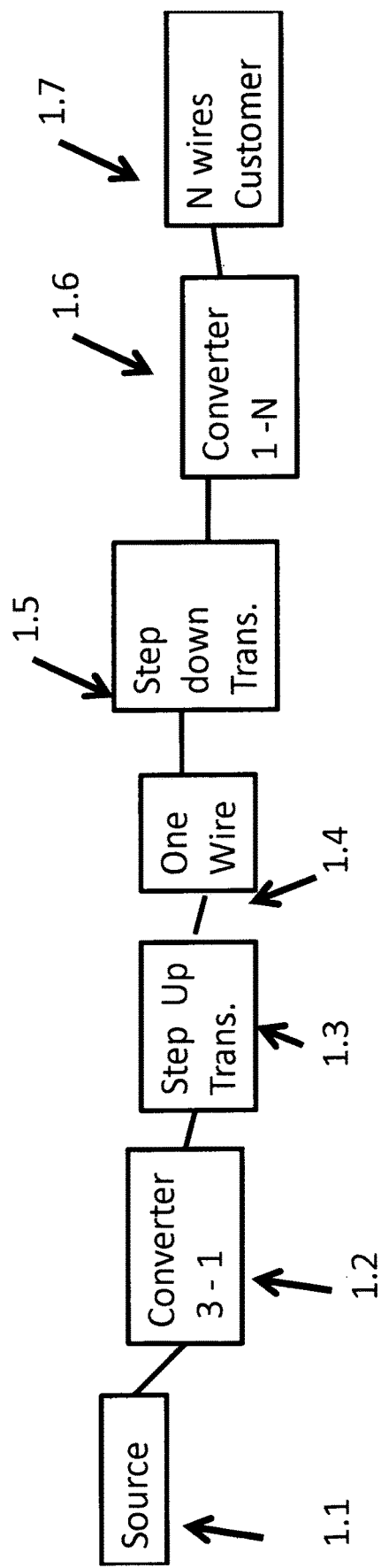
FIG. 1 of the drawings is a view showing a known system and a known method for transmitting electrical energy.

An existing system for executing an existing method of transmitting electrical energy is shown in FIG. 1. In a generating station 1.1 usually a three-phase electric current is generated, it is converted in a converter 1.2 into a one wire electric current whose voltage is then increased by a step-up transformer 1.3, transmitted through a one-wire line 1.4, and then its voltage is reduced by a step-down transformer 1.5. Then the one wire electric current is converted in a converter 1.6 into an N-wires electric current and supplied to an N-wires electric current consumer 1.7.

Figure 2:
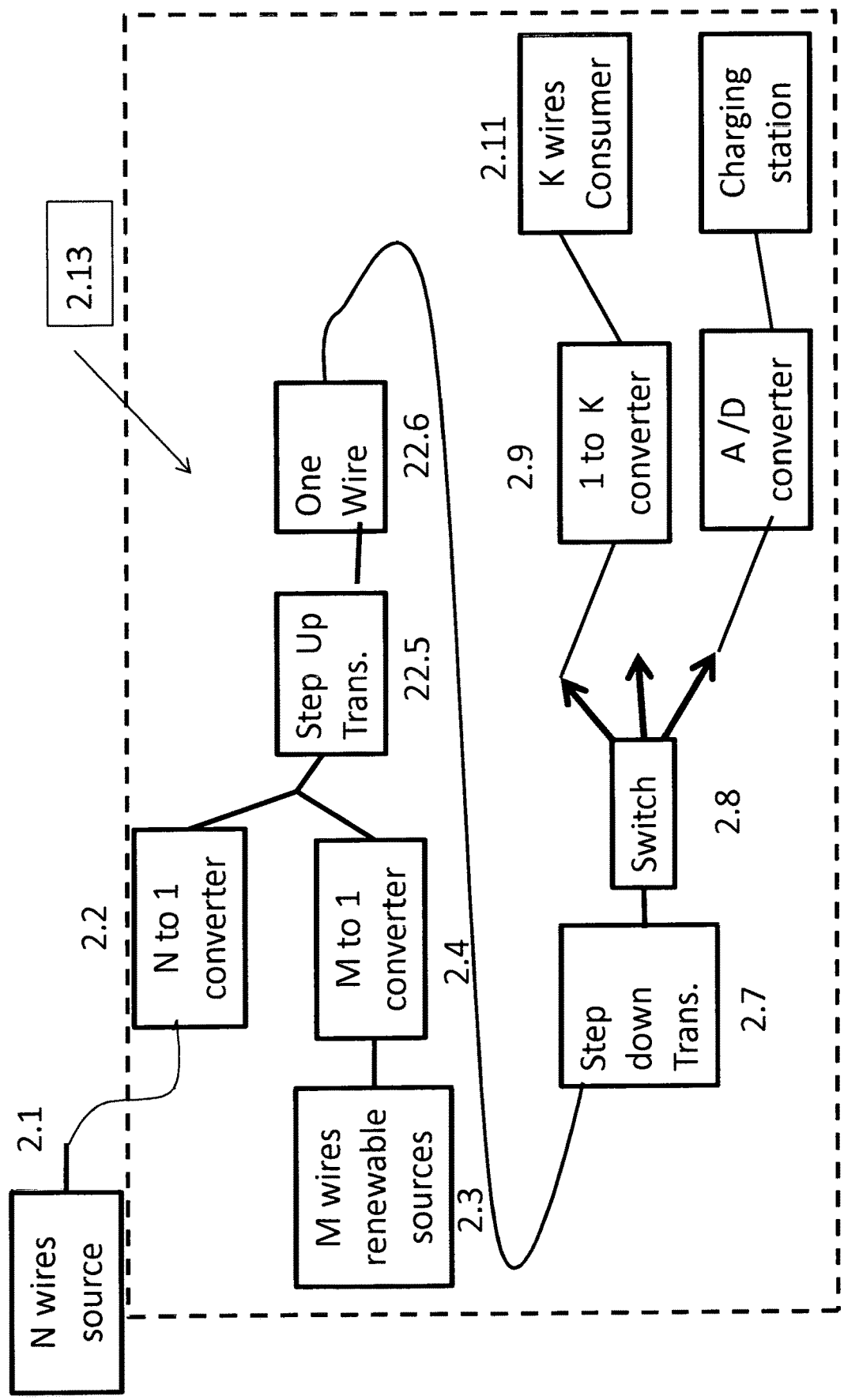
FIG. 2 of the drawings is a view showing a new system and a new method for transmitting electrical energy in accordance with the present invention.

The new system for executing the new method in accordance with the present invention shown in FIG. 2. From an N wires electric current source 2.1 the N wires electric current is transmitted to an N to 1 converter 2.2 in which this electric current is converted into a single wire current supplied to a step up transformer 2.5. From M wires source which can be a renewable source 2.3 an electric current is transmitted to an M to 1 converter 2.4 in which this electric current is also supplied to the step up transformer 2.5. In the step up transformer 2.5 a voltage of the summated electric current is increased and transmitted to a one-wire converter 2.6 which converts it into a one-wire electric current with the increased voltage. It is then transmitted through a one-wire transmission line.

At the opposite side of the one-wire transmission line the one-wire electric current is supplied to the step-down transformer 2.7 which reduces the voltage of the one-wire electric current and this electric current with the reduced voltage is supplied to a switch 2.8. The switch 2.8 performs two functions. First of all, it subdivides the received one-wire electric current into several one wire electric currents. Also, it then directs these one wire electric currents in different directions towards different consumers.

One of these one-wire electric currents can be converted by a converter 2.9 into a K-wires electric current supplied to a K-wires electric current consumer 2.11. The other of these one-wire electric currents can be converted by a converter 2.10 into ND current supplied to a consumer 2.12 which can be for example an electric vehicle charging station.

Figure 3:
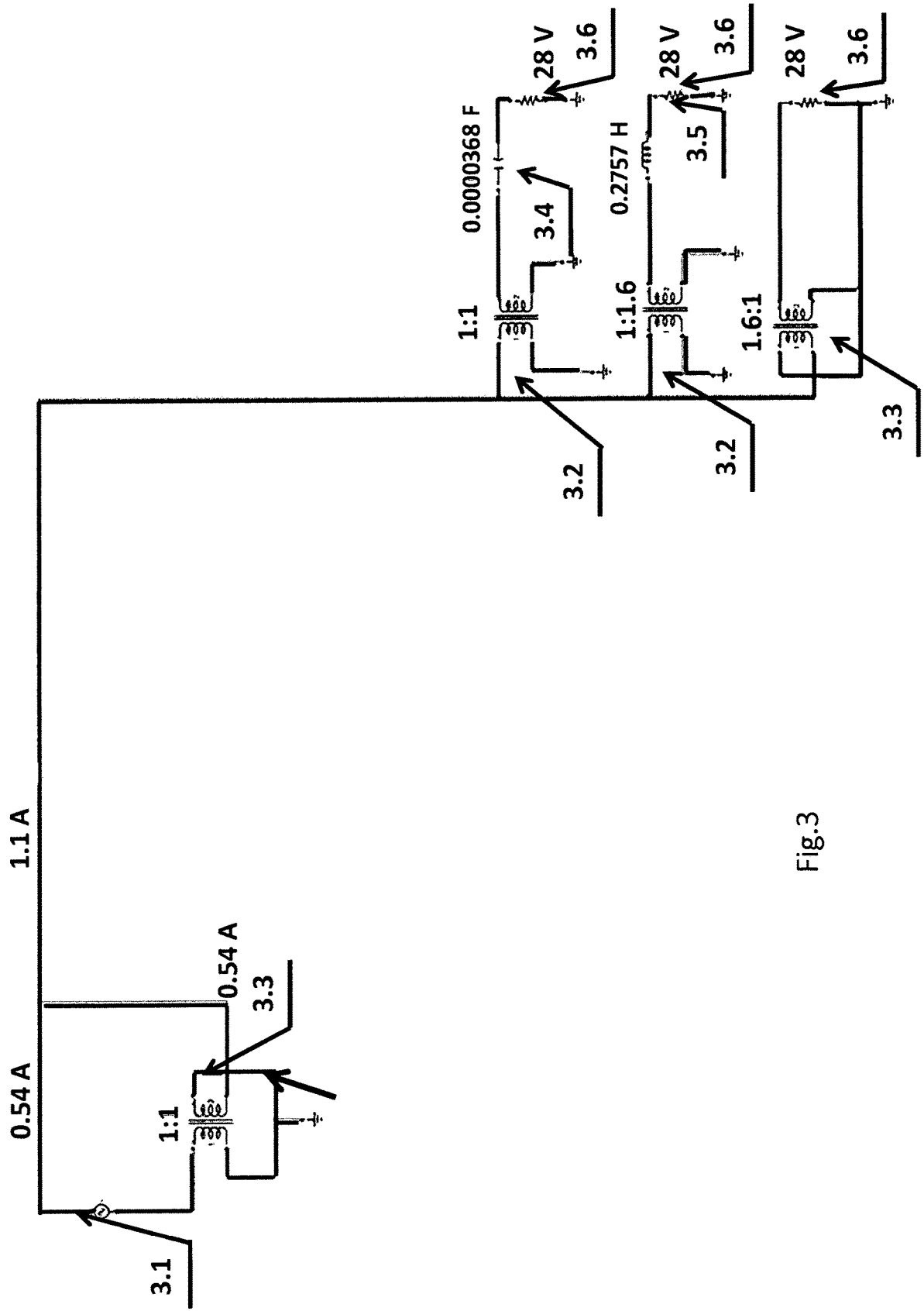
FIG. 3 of the drawings is a view showing components for transition from a two-wire electric signal to a single-wire electric signal and from the single-wire electric signal to a three-wire electric signal.

Converters for transition from a two-wire electric current to a single wire electric current 2-1 and from the single-wire electric current to a three-wire electric current 1-3 are shown in FIG. 3. In these components 3.1 is a source, 3.2 is a transformer, 3.3 is an inverter, 3.4 is a capacitor, 3.5 is an inductor, and 3.6 is a resistor. The converter 2-1 converts a two-wire signal into a one wire signal and a phase shift takes place in the inverter 3.3. In outlet converters, for example in the converter 1.3 in the beginning from an output signal first a desired number of identical signals (in other words three signals) are formed. Then the phases of these signals are established by the devices 3.3, 3.4, 3.5 in accordance with the requirements of the device 1.3. The resister 3.6 form loads. The results of the simulation are shown in the drawings.

Figure 4:
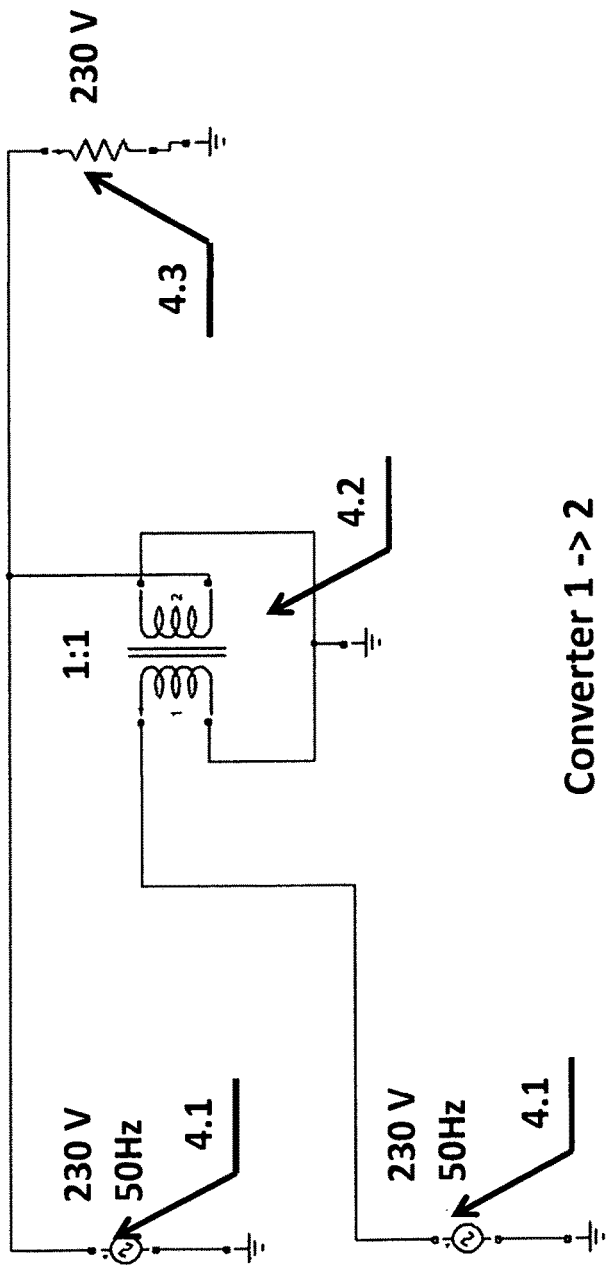
FIG. 4 is a view showing components for transition from a two-wire electric signal to a single-wire electric signal and from the single-wire electric signal to a two-wire electric signal.
Figure 4:
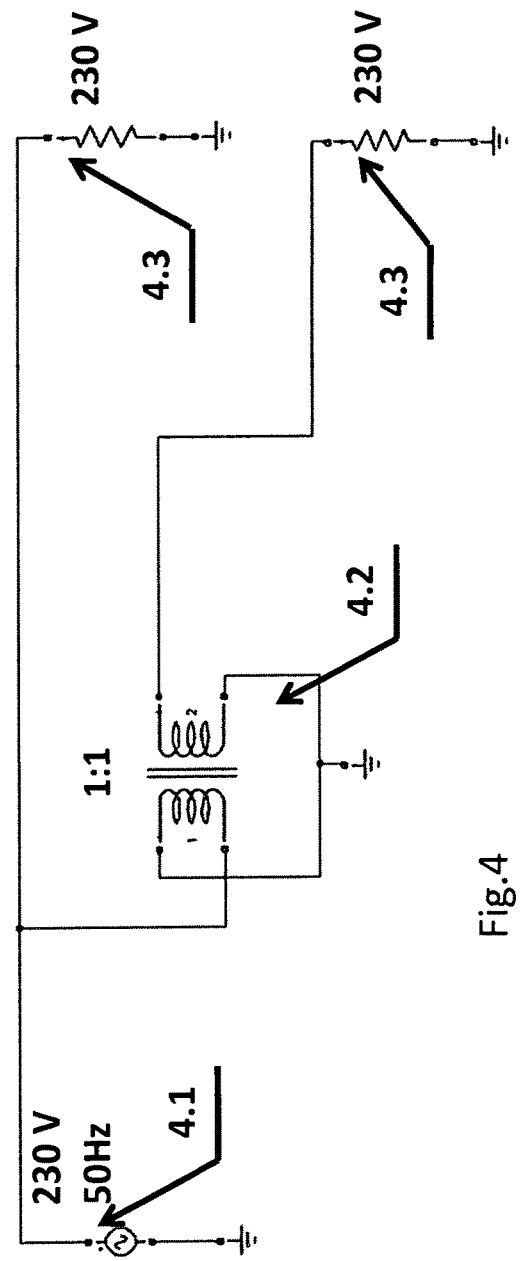

The scheme of a converter 2.1 for transition from a two-wire signal into one-wire signal and of a converter 1-2 for transition from a one-wire signal into a two-wire signal is shown in FIG. 4. In this FIG. 4.1 is a source, 4.2 is an inverter, 4.3 is a resister. The inverter 4.2 change a polarity of one of the signals so as to convert both signals into identical signals which can be added. In the converter 1-2 the input signal is divided into two identical signals, and one of them is inverted by the inverter 4.2. The resisters 4.3 form loads. The results of the simulation are shown in the drawings.

Figure 5:
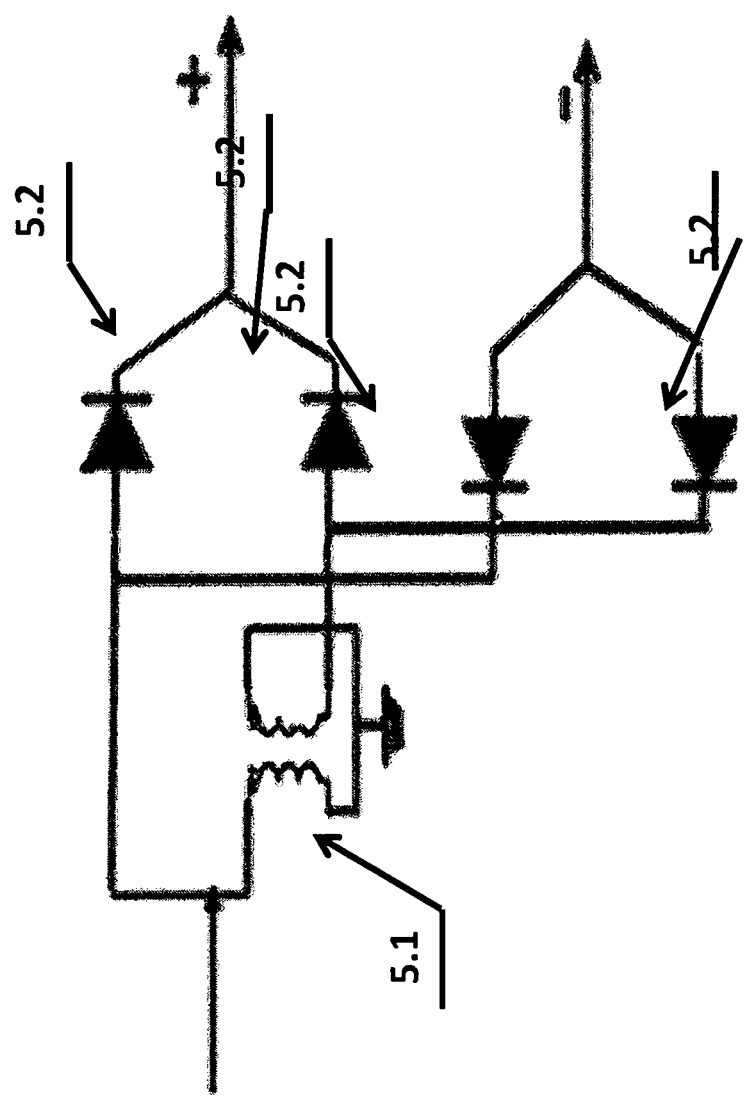
FIG. 5 is a view showing a converter for converting a single-wire signal into a direct current signal for example for charging electric current transporting devices.

FIG. 5 shows a converter 1-DC for converting a one-wire signal in a DC signal which is needed for example for charging electric cars. First the input signal is converted into a two-wire signal. Then both signals are supplied to diodes 5.2 with use of their polarities so that a two-pole signal of direct current is produced at the outlet.

Figure 6:
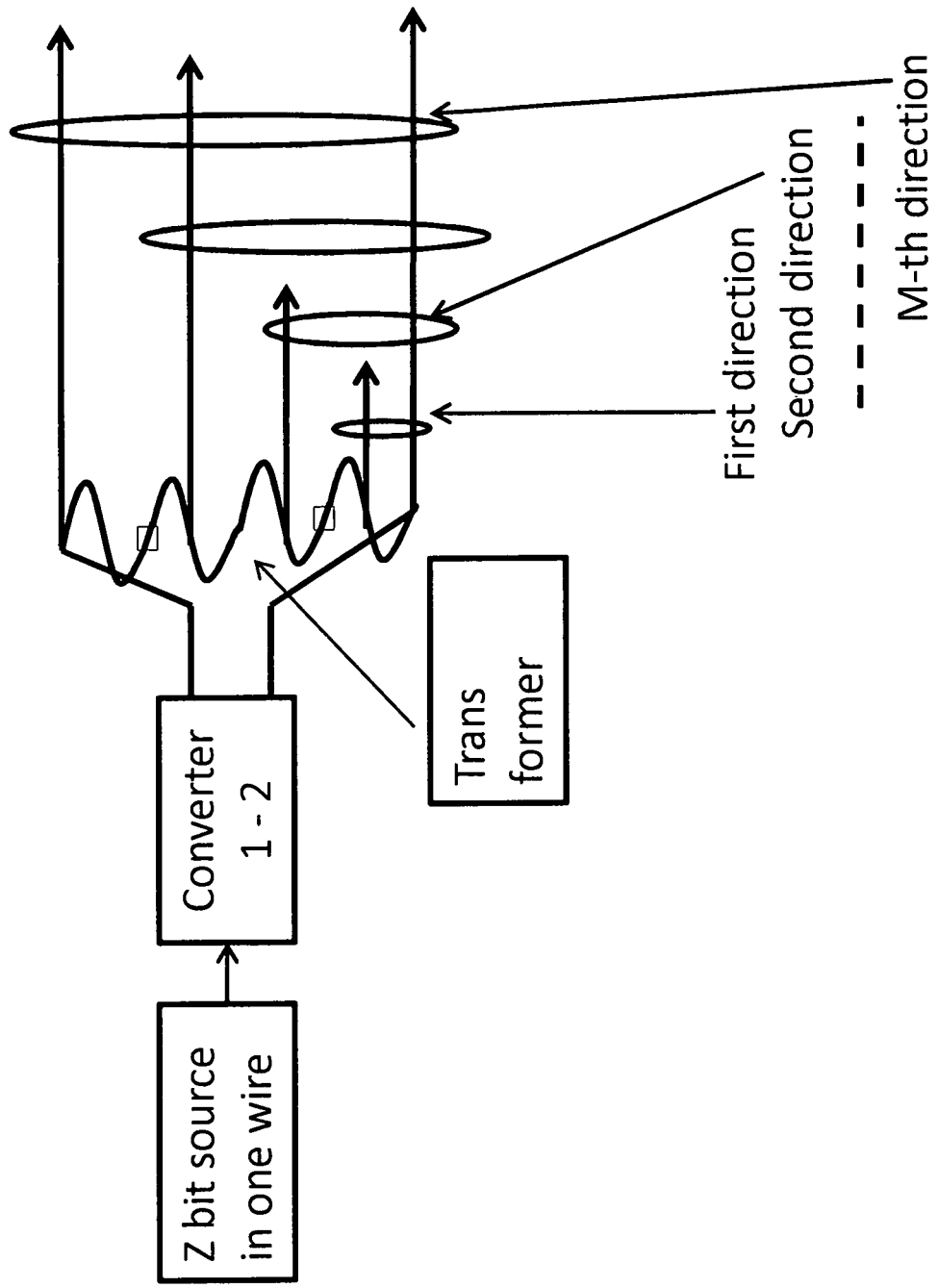
FIG. 6 is a view showing a system for using three-phase units as three separate systems.

FIG. 6 shows that the proposed system and method allows to use three-phase constructions as three separate systems. In other words, the efficiency of a three-phase system can be increased three times. Each of the three lines 2.13 can transmit Z/3 bits information. This is a very important advantages of the system and method according to the present invention.

The present invention with its novel features is defined in the appended claims.

What we claim is:

1. A system for transmitting electrical energy, comprising
a plurality of sources of electric energy generating electric currents transmitted through different numbers of wires;
converters receiving the electric currents transmitted through different numbers of wires from the plurality of sources and converting these electric currents into single-wire electric currents;
a step-up transformer receiving the single-wire electric currents from the converters and converting them into single-wire electric currents with an increased voltage;
a one-wire converter receiving from the step-up transformer the single-wire electric currents with the increased voltage and converting them into a one-wire electric current with the increased voltage;
a one wire transmission line through which the one-wire electric current with the increased voltage received from the one-wire converter is transmitted;
a step-down transformer receiving from the one-wire transmission line the transmitted one-wire electric current with the increased voltage and reducing its voltage so as to produce a one-wire electric current with a reduced voltage;
a switch receiving from the step-down transformer the one-wire electric current with the reduced voltage, generating from the received one-wire electric current several one wire electric currents with the reduced voltage and transmitting the generated several one-wire electric currents with the reduced voltage in several directions towards consumers;
converters receiving from the switch the single-one wire electric currents with the reduced voltage and converting them into different electric currents; and
consumers receiving from the converters the different electric currents.

2. The system for transmitting electrical energy of claim 1, wherein said plurality of sources of electrical energy are selected from the group consisting of multi-wire sources of electrical energy and renewable electrical energy sources.

3. The system for transmitting electrical energy of claim 1, wherein said consumers are selected from the group consisting of a multi-wire electrical energy consumer and an electric vehicle charging electrical energy consumer.

4. A method of transmitting electrical energy, comprising the steps of
generating electric currents transmitted through different numbers of wires by a plurality of sources;
converting the electric currents transmitted through different numbers of wires by converters into single-wire electric currents;
increasing a voltage of the single-wire electric currents received from the converters so as to produce single-wire electric currents with an increased voltage;
converting the single-wire electric currents with an increased voltage into a one wire electric current with an increased voltage;
transmitting the one-wire electric current with the increased voltage through a one-wire electrical current transmission line;
reducing a voltage of the transmitted one-wire electric current with the reduced voltage;
generating from the transmitted one-wire electric current with the reduced voltage several one-wire electric currents with the reduced voltage,
converting the several electric currents with the reduced voltage into different electric currents; and
supplying the different electric currents to corresponding consumers.

5. The method of transmitting electrical energy of claim 4, further comprising selecting said plurality of sources of electrical energy from the group consisting of multi-wire sources of electrical energy and renewable electrical energy sources.

6. The method of transmitting electrical energy of claim 4, further comprising selecting said consumers from the group consisting of a multi-wire electrical energy consumer and an electric vehicle charging electrical energy consumer.

* * * * *